United States Patent [19]
Akiyama et al.

[11] 3,734,069
[45] May 22, 1973

[54] SYSTEM FOR PURIFYING THE EXHAUST GAS OF A TWO-CYCLE GASOLINE INJECTION ENGINE

[75] Inventors: Yoshio Akiyama, Tadanori Sato, Shinobu Koyama, all of Tokyo, Japan

[73] Assignee: Fuji Heavy Industry Co., Ltd., Tokyo-to, Japan

[22] Filed: Nov. 16, 1970

[21] Appl. No.: 89,729

[30] Foreign Application Priority Data

Nov. 14, 1969 Japan .............................. 44/91253

[52] U.S. Cl. ........ 123/32 SP, 123/32 ST, 123/117 R, 123/65 R
[51] Int. Cl. .............................................. F02p 5/04
[58] Field of Search ............... 123/117 R, 32, 32 SP, 123/32 ST

[56] References Cited

UNITED STATES PATENTS

| | | | |
|---|---|---|---|
| 2,893,360 | 7/1959 | Muller | 123/32 SP |
| 2,916,023 | 12/1959 | Sanborn | 123/32 SP |
| 2,094,860 | 10/1937 | Timian et al. | 123/117 R |

Primary Examiner—Laurence M. Goodridge
Attorney—Sughrue, Rothwell, Mion, Zinn and Macpeak

[57] ABSTRACT

A system for purifying an exhaust gas of two-cycle gasoline injection engine has an automatic injection nozzle disposed relative to a cylinder displaced from the central axis of the cylinder toward the exhaust port to eject the gasoline in the direction intermediate the center of the piston crown when disposed at the bottom dead center point and the cylinder wall opposite the exhaust port and also against the scavenging gas stream flowing from the scavenging port to the cylinder head. The spray angle is selected in the range of 15° to 60°. The end of stationary injection timing is selected in the range from the bottom dead center to 30° after the bottom dead center, and its injection duration held to less than 1.5 millisecond. An injection pump completely shuts off the fuel during high speed - no load operations, and the throttle valve, accelerator pedal and ignition timing means are interlocked so that the throttle valve may not close less than a predetermined opening upon light load operation to maintain the idle speed of the engine. Its ignition timing is changed in response to the opening of the accelerator less than the predetermined opening in order to reduce the concentration of exhaust hydrocarbon and carbon monoxide.

2 Claims, 3 Drawing Figures

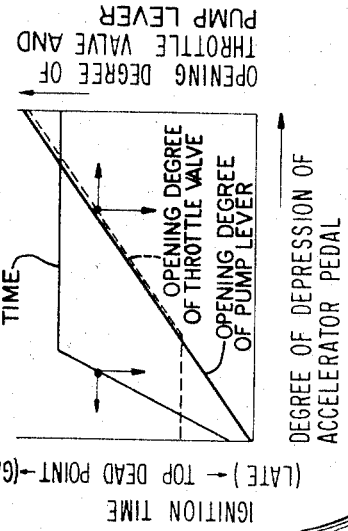
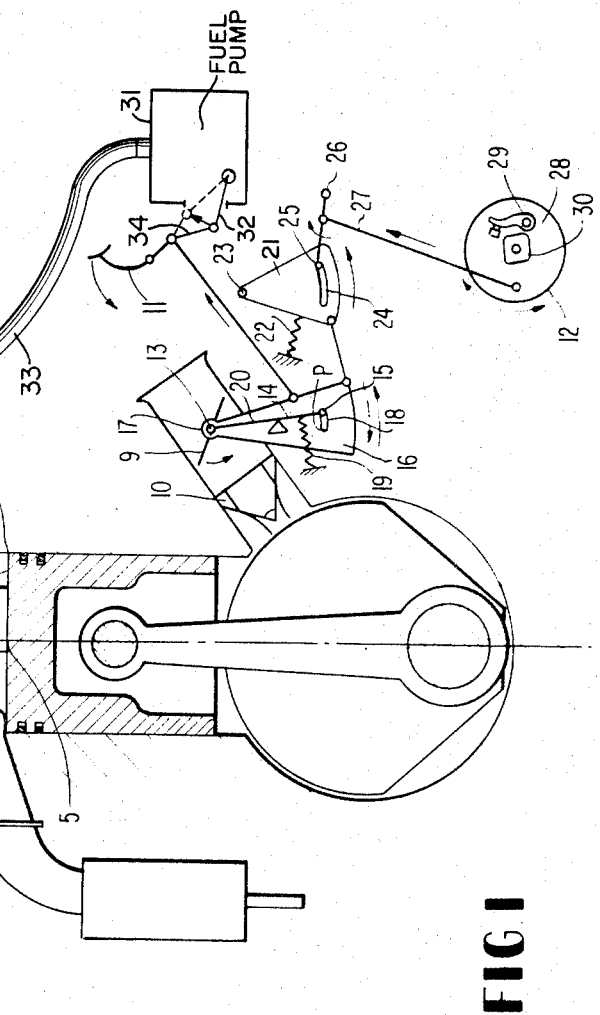
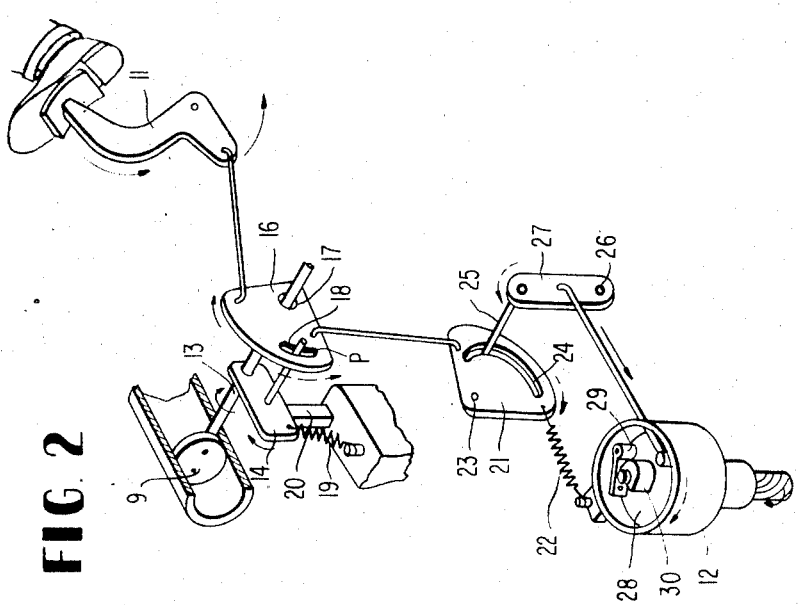

SYSTEM FOR PURIFYING THE EXHAUST GAS OF A TWO-CYCLE GASOLINE INJECTION ENGINE

BACKGROUND OF THE INVENTION

FIELD OF THE INVENTION

This invention relates to a system for purifying the exhaust gas of two-cycle gasoline injection engine, and more particularly to a system adapted for reducing the concentration of hydrocarbon and carbon monoxide contained in the exhaust gas of the engine.

The concentration of the hydrocarbon contained in the exhaust gas of a two-cycle gasoline engine is higher than that of a four-cycle gasoline engine, and this is particularly true when the engine for automobile use, because of the short circuit of fuel during its scavenging duration of the engine and of irregular combustion or intermittent combustion during light load which does not occur in every cycle.

A catalytic purifying device, after-burner purifying device and stratified charge combustion system for gasoline injection engine are known for purifying exhaust gas for a two-cycle gasoline engine, particularly the hydrocarbon contained in the exhaust gas of the engine.

The conventional stratified charge combustion in the two-cycle gasoline engine is to properly produce a swirl of the gas mixed with the residual gas from its previous cycle and fresh air before its ignition, thereby separating the residual gas and the fresh air in a stratified state so that fuel is ejected into the fresh air, thereby producing combustible mixture gas. The feature of this combustion is to enable complete burning lean mixture gas.

The catalytic purifying device and after-burner purifying device have additional special parts which restrict the endurability and life of the device itself.

The stratified charge combustion is advantageous in comparison with the aforesaid catalytic purifying device and after-burner purifying device at the point of the possibility of purifying the exhaust gas by a partial modification of the structure of the engine, but it is difficult to prevent the concentration of hydrocarbon from increasing due to its short circuit of the fuel. Furthermore, it has another restriction in the point of worse air utilization rate in case of increase in the engine power at high speed.

If some necessary requirements are added to the respective elements of two-cycle gasoline injection engine, the concentration of the exhausted hydrocarbon and carbon monoxide may be reduced to a minimum, characteristics of irregular combustion of the two-cycle gasoline engine upon load may be improved by adding an ignition timing control mechanism and yet a great exhaust gas purification may be possible by inducing the combustion of the hydrocarbon within an exhaust manifold.

SUMMARY OF THE INVENTION

It is, therefore, one object of the present invention to provide a system for purifying an exhaust gas of two-cycle gasoline injection engine which reduces the concentration of hydrocarbon and carbon monoxide contained in the exhaust gas of the engine.

It is another object of the present invention to provide a system for purifying an exhaust gas of two-cycle gasoline injection engine which performs purification of the exhaust gas of the engine without the need of adding particular exhaust gas purifying device and without reducing greatly the full power of the engine by a partial revision of the structure of the engine.

According to one aspect of the present invention, there is provided a system for purifying an exhaust gas of two-cycle gasoline injection engine which has an automatic injection nozzle so installed in a cylinder of said engine that it is disposed at a position displaced from the central axis of the cylinder toward the exhaust port side. It ejects the gasoline in a direction intermediate the center of the piston crown when disposed at the bottom dead center point and the cylinder wall opposite the exhaust port and also ejects the gasoline in a direction against the scavanging gas stream flowing from the scavenging port to the cylinder head. Its spraying angle is selected in the range of 15° to 60° to vertical. The end of stationary injection timing is selected in the range from the bottom dead center point to 30° after the bottom dead center point, and its injection duration is less than 1.5 millisecond. An injection pump is so arranged as to completely shut off the fuel during high speed - no load operation, such as downhill coasting and the throttle valve, accelerator pedal and ignition timing means are interlocked so that the throttle valve may not close less than a predetermined opening upon light load operation to maintain the idle speed of the engine. Its ignition timing is changed in response to the opening of the accelerator less than the predetermined opening in order to reduce the concentration of exhaust hydrocarbon and carbon monoxide.

BRIEF DESCRIPTION OF THE DRAWINGS

The other objects, features and advantages of the present invention will become apparent from the following description taken in conjunction with the accompanying drawings, in which:

FIG. 1 is a schematic view of an arrangement of two-cycle gasoline engine having a system constructed according to the present invention.

FIG. 2 is a perspective view of the system for delaying the ignition timing upon light load as one example for the explanatory purpose of the present invention.

FIG. 3 is a graphical representation of the relationship between the opening of the accelerator pedal, opening of the throttle valve and ignition timing of the engine.

DESCRIPTION OF THE PREFERRED EMBODIMENT

Reference is now made to the drawings, and particularly to FIG. 1, which shows one embodiment of the present invention. An automatic injection nozzle 1 is installed in a cylinder head 2 of a direct injection type of two-cycle gasoline engine for injecting fuel directly within a cylinder. The automatic injection nozzle 1 is disposed at a position displaced from the central axis 3 of the cylinder toward an exhaust port 4 formed at the side of the cylinder. The ejecting direction of the injection nozzle 1 is intermediate the center 5 of the piston crown when disposed at the bottom dead center point and the cylinder wall 6 opposite to the exhaust port 4. In order to prevent misfiring, it is necessary that an ignition plug 7 be disposed at a place where the gasoline is not directly sprayed on the same. Reference numeral 8 illustrates a scavenging port from which a scavenging stream flows to the cylinder head 2. The spray angle A is selected to lie in the range of 15° to 60°.

The setting of the injection timing and duration are especially important, and it is necessary to select the timing of the end of stationary injection in the range from the bottom dead point to 30° after the bottom dead point. Its injection duration is set within 1.5 millisecond. The injection pump of the fuel must be selected in such a structure so as to abruptly and completely shut off the fuel in the no load region upon engine high speed operation. In FIG. 1, an injection pump 31 supplies fuel to the automatic injection nozzle 1, the pump being operated at a ratio of 1:1 in terms of the revolutions of the crank shaft of the engine (not shown) by connecting the pump 31 with the engine crank shaft in a conventional manner, either directly or through a toothed belt. The injection pump 31 is of a known design and construction that is available in the industry and includes an adjusting device for limiting the injection duration to any desired length of time. The timing of the injection may also be adjusted by any well-known manner, such as by moving the injection pump housing relative to the drive shaft thereof or by adjusting a well-known timing adjusting mechanism which is built into the injection pump 31 in a well-known manner. A high pressure pipe 33 connects the injection nozzle 1 to the injection pump 31. A fuel control lever 32 is coupled to the accelerator pedal 11 such that it moves at a ratio of 1:1 through a rod 34 with the accelerator pedal 11, that is, when the accelerator pedal 11 is fully released, the fuel control lever 32 of the injection pump 31 returns to the idle position. Generally, this structure may readily be performed.

In such a gasoline injection engine, a throttle valve 9, accelerator pedal 11 and ignition timing setting device that is commonly a contact breaker, are connected by an interlocking mechanism for delaying an ignition timing upon light load operation including idling. A reed valve 10, which may be any other mechanism than as shown. The aforesaid interlock mechanism for delaying the ignition timing upon light load operation may be of the mechanical or electrical type, and one example of mechanical type interlocking mechanism will now be described with respect to FIG. 2, which shows the system for delaying the ignition timing upon light load of the engine.

A butterfly throttle valve 9 provided in an air intake passage is integral with shaft 13, and the shaft 13, and levers 14 and 15 rotate in unison.

A lever 16 is in the state of being rotatable freely at bearing portion 17. If the accelerator pedal 11 is now depressed, the lever 16 may rotate in the direction as shown by an arrow, around 17 as a center, so that it may rotate the shaft 13 in the direction as shown by an arrow through the levers 14 and 15 by one end P of the long hole 18, with the result that the throttle valve 9 may open to normally control the output power.

On the other hand, if the accelerator pedal 11 is released, the throttle valve 9 gradually closes by the operation of a return spring 19 provided at the lever 14, but may not close less than a slight predetermined opening due to stopper 20 provided as shown to maintain the idle speed of the engine. If the accelerator pedal is further released, a lever 21 and the lever 16 may rotate in the direction as shown by a dotted arrow around 23 and 17 as centers, respectively, by the operation of a return spring 22 provided on the lever 21. Whereupon, the lever 25 carried by a cam groove 24 provided within the lever 21 may rotate a lever 27 in the direction as shown by a dotted arrow about shaft 26 as a center. This movement may be considered to give any characteristics as shown in FIG. 3 according to the shape of the cam groove 24.

An ignition contact breaker body 12, a rotatable contact breaker plate 28 and a contact breaker 29 determine ignition timing and may rotate freely together with the body 12. The ignition timing may be determined by the timing required to open the contact point of the breaker 29 by the rotating cam 30 in the direction designated by a solid arrow, FIG. 1. As aforementioned, the lever 27 may rotate in the direction illustrated by a dotted arrow by the return action of the accelerator pedal. This is the same as the rotation of the cam shaft, and as shown in FIG. 3, it may delay the ignition timing. Thus, the present invention provides a combined advantageous effect of the aforesaid components and parts constructing the invention.

It should be understood from the foregoing description that since the disposition and ejecting direction of the automatic injection nozzle are selected as aforesaid, the scavenging air moving from the scavenging port toward the cylinder head collides with the gasoline spray ejected so as to improve their mixture.

It should further be understood that part of the fuel collides with the piston crown at high temperature and is well evaporated. Thus, the evaporation of fuel and uniform mixture of fuel and air required for perfect combustion is provided.

It should be understood also that it is effective to reduce the short circuit of fuel during injection, by ejecting fuel opposite to the direction of the exhaust port.

If the spray angle is excessive, the short circuit of fuel to the exhaust port is increased, while if it is extremely insufficient, the mixture of fuel and fresh air becomes worse, resulting in a uniform mixture not being obtained so that it causes incomplete combustion. Accordingly, selection must be in the range of 15° to 60°.

If the end of the injection is delayed, it is possible to prevent the short circuit of fuel, but it cannot obtain the correct time required for the evaporation of fuel during high speed operation of the engine to cause incomplete combustion so as to increase the concentration of the hydrocarbon. If the end of injection is advanced earlier, the short circuit of fuel during injection is increased so that the concentration of the hydrocarbon increases. Accordingly, it is necessary to select the stationary end of injection in the range of the bottom dead center point to 30° after the bottom dead center. If the fuel injection duration increases, the short circuit of fuel is increased, so that it is necessary to provide injection within 1.5 millisecond.

The fuel shutting off device is particularly necessary for reducing the concentration of the hydrocarbon upon deceleration in case of an automotive engine. As will be hereinafter described, if this system is combined with an ignition timing delaying mechanism, it is particularly effective for preventing abnormal combustion produced within the exhaust pipe at high speed.

Though, the concentration of the hydrocarbon may be considerably reduced by the aforementioned operation, the increase of concentration of the hydrocarbon due to its irregular combustion upon light load may not be prevented.

In order to eliminate irregular combustion and to improve the purification rate of the exhaust gas due to the afterburning of the short circuit gas within the exhaust manifold, the aforesaid interlocking mechanism for the accelerator pedal, throttle valve, and ignition timing setting device may be accommodated so as to control the output power of the engine by its ignition timing. This control device may be most advantageous in combination with the gasoline injection engine for purifying the exhaust gas, but may not be advantageous in combination with a carburetor engine or stratified charge engine.

In order to prevent the irregular combustion at the low opening of the throttle valve of the two-cycle gasoline engine, it is necessary to supply the required amount of air for continuous combustion in response to the operating conditions and to sufficiently scavenge the cylinder.

The throttle valve may not close less than a predetermined opening as means for supplying the required amount of air in order to maintain the idle speed of the engine. However, this cannot continue at any light load operation due to the increase of the output power of the engine, and accordingly, the power control may be performed by changing the ignition timing in cooperation with the accelerator pedal. It means that the power may be reduced by delaying the ignition timing. FIG. 3 shows the relationship between the depression of the accelerator pedal, opening of the throttle valve and ignition timing of the engine.

It shows that if the ignition timing is delayed, the exhaust gas temperature may be increased, so that the short circuit hydrocarbon may be afterburned within the exhaust manifold.

Since the gasoline injection engine may independently select the supply air amount and fuel rate different from the carburetor engine, the air required for the combustion in the exhaust manifold may be excessively supplied regardless of the fuel. If the combustion within the exhaust manifold is thus utilized, since the ignition timing is delayed if the fuel is not shut off in the coasting region, from high speed particularly, the fuel may not burn perfectly within the cylinder, so that the exhaust manifold temperature increases abnormally, or in particular case, abnormal combustion may occur within the cylinder so as not to provide a spark ignition.

In order to prevent this, it is necessary to provide an injection pump for completely shutting off the fuel in the high speed coasting region. If the fuel is not supplied when the accelerator pedal is fully released at coasting operation, the short circuit gas may not exist with the result that the abnormal combustion may not naturally occur.

If this ignition timing control means is combined with a carburetor engine, the irregular combustion may only be improved, but there is insufficient air to afterburn it within the exhaust manifold. The reason why is the rate of the air to fuel may be automatically produced, and its value must be set at a proper range for burning within the cylinder, and accordingly it is necessary to supply more secondary air so as to burn the exhaust gas within the exhaust manifold.

The stratified charge combustion method intends to gather the combustible mixture gas around the ignition plug, but the atomization of the fuel may not always be good and the mixture with the air is not uniform, so that since the required combustion time is long, the ignition timing cannot be delayed. Accordingly, this may not be consistent with the present invention.

Thus, if the present invention is applied to the two-cycle direct injection gasoline engine for ejecting fuel directly within the cylinder, the concentration of the hydrocarbon may be reduced to less than one-tenth otherwise and that of the carbon monoxide may be less than one-half without adding particular purifying device, or without reducing greatly the performance of the engine with part revision of the structure of the engine in comparison with the normal carburetor equipped engine.

What is claimed is:

1. A system for purifying exhaust gases of a two-cycle gasoline spark-ignition engine having fuel injection comprising:

an automatic injection nozzle positioned in a cylinder head of said engine for injecting fuel into the interior of a cylinder, said automatic injection nozzle being disposed in a position displaced from the central longitudinal axis of the cylinder in a direction toward the exhaust port side of said engine, said injection nozzle injecting fuel in a direction intermediate the center of the piston crown of said engine when the piston is disposed at bottom dead center and the cylinder wall of said engine opposite the exhaust port, said injection nozzle being further disposed in the direction opposite the scavenging gas stream flowing into the cylinder from the scavenging port of said engine to the cylinder head, the spraying angle of said injection nozzle being selected in the range from 15° to 60°, the end of stationary injection timing of said injection nozzle being selected in the range from bottom dead center to 30° after the bottom dead center position of the piston, the duration of the injection selected to be less than 1.5 milleseconds;

an injection pump operatively connected to said injection nozzle for supplying fuel to said injection nozzle, said injection pump adapted to completely shut off the supply of fuel to said injection nozzle upon a high speed - no load operation of said engine;

a throttle valve for controlling the supply of air to said engine;

an ignition timing means for advancing and retarding the timing of the ignition of the spark plug of said two-cycle gasoline engine;

an accelerator pedal means for controlling said throttle valve, said fuel injection pump and said ignition timing means; and linkage means operatively connecting said accelerator pedal with said throttle valve, said fuel injection pump and said ignition timing means, said linkage means including stop means to prevent the closing of said throttle valve less than a predetermined opening to maintain an idle speed of the engine upon light load engine operation, said linkage means interconnecting said accelerator pedal and said ignition timing means to permit selective retardation of the ignition timing during light load operations during movement of said accelerator pedal less than said predetermined opening position of said throttle valve.

2. The system as set forth in claim 1, wherein said linkage means comprises: a butterfly throttle valve provided in an air intake passage and integrally coupled to a shaft supported by said engine, first and second levers rotating integrally with said shaft, a third lever freely rotatable about a bearing portion supported by said engine, a first return spring engaged with said second lever for urging said second lever, a stopper for stopping said second lever so that it may not close to less than a predetermined limit, a fourth lever interconnected to said linkage consisting of said first, second and third levers, a second return spring engaged with said fourth lever for urging said fourth lever, a cam groove within said fourth lever, a fifth lever operatively received by said cam groove, a sixth lever interconnecting said fifth lever and said ignition contact breaker to rotate the same.

* * * * *